(12) United States Patent
Guru et al.

(10) Patent No.: US 7,646,771 B2
(45) Date of Patent: *Jan. 12, 2010

(54) COMPILATION OF ACCESS CONTROL LISTS

(75) Inventors: Parthibhan Parama Guru, Bangalore (IN); Vinodh Kumar, Bangalore (IN); Andrew McRae, Berowra (AU)

(73) Assignee: Cisco Technology, Inc., San Jose, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/236,890

(22) Filed: Sep. 28, 2005

(65) Prior Publication Data

US 2007/0041318 A1     Feb. 22, 2007

(30) Foreign Application Priority Data

Aug. 17, 2005   (IN) .................. 2194/DEL/2005

(51) Int. Cl.
*H04L 12/28* (2006.01)
*H04L 12/56* (2006.01)

(52) U.S. Cl. ..................... 370/392; 709/242

(58) Field of Classification Search .......... 370/351, 370/392, 395.31; 709/242, 245
See application file for complete search history.

(56) References Cited

U.S. PATENT DOCUMENTS

| | | | |
|---|---|---|---|
| 5,027,350 A | 6/1991 | Marshall | |
| 5,473,607 A | 12/1995 | Hausman et al. | |
| 5,509,006 A | 4/1996 | Wilford et al. | |
| 5,852,607 A | 12/1998 | Chin | |
| 5,872,783 A | 2/1999 | Chin | |
| 5,881,242 A | 3/1999 | Ku et al. | |
| 5,917,820 A | 6/1999 | Rekhter | |
| 6,091,725 A | 7/2000 | Cheriton et al. | |
| 6,167,445 A | 12/2000 | Gai et al. | |
| 6,219,706 B1 | 4/2001 | Fan et al. | |
| 6,243,667 B1 | 6/2001 | Kerr et al. | |
| 6,266,705 B1 | 7/2001 | Ullum et al. | |
| 6,282,546 B1 | 8/2001 | Gleichauf et al. | |
| 6,289,013 B1 | 9/2001 | Lakshman et al. | |
| 6,308,219 B1 | 10/2001 | Hughes | |
| 6,324,656 B1 | 11/2001 | Gleichauf et al. | |
| 6,341,130 B1 * | 1/2002 | Lakshman et al. | 370/389 |
| 6,377,577 B1 | 4/2002 | Bechtolsheim et al. | |

(Continued)

OTHER PUBLICATIONS

Engler, D., et al., DPF: Fast, Flexible Message Demultiplexing Using Dynamic Code Generation, 1996, pp. 53-59.

(Continued)

*Primary Examiner*—Chirag G Shah
*Assistant Examiner*—Minh-Trang Nguyen
(74) *Attorney, Agent, or Firm*—Cesari and McKenna, LLP

(57) ABSTRACT

An improvement in the compilation of classification tables from across control lists increases the efficiency of memory utilization by fragments in the lower level tables and using the classification ID's from a pair of higher-level tables as pointers to the fragments and as indicators of the depth of the entries in the fragments. A further improvement makes use of aggregate bit vectors, thereby simplifying construction of the lower-level tables. The bit-vector sections preferably coincide with the cache lines of the processing, thereby maximizing the speed with which the relevant bits in the bit vector can be identified from the aggregate bit vectors.

26 Claims, 17 Drawing Sheets

U.S. PATENT DOCUMENTS

| | | |
|---|---|---|
| 6,449,256 B1 | 9/2002 | Varghese et al. |
| 6,463,474 B1 | 10/2002 | Fuh et al. |
| 6,529,508 B1 | 3/2003 | Li et al. |
| 6,609,154 B1 | 8/2003 | Fuh et al. |
| 6,643,260 B1 | 11/2003 | Kloth et al. |
| 6,651,096 B1 | 11/2003 | Gai |
| 6,665,293 B2 | 12/2003 | Thornton et al. |
| 6,715,029 B1 | 3/2004 | Trainin et al. |
| 6,847,638 B1 | 1/2005 | Wu et al. |
| 6,854,063 B1 | 2/2005 | Qu et al. |
| 6,871,265 B1 | 3/2005 | Oren et al. |
| 6,892,237 B1 | 5/2005 | Gai et al. |
| 6,970,462 B1 | 11/2005 | McRae |
| 7,200,114 B1 * | 4/2007 | Tse-Au ........................ 370/231 |
| 2006/0187836 A1 * | 8/2006 | Frey et al. ................... 370/235 |

OTHER PUBLICATIONS

SIGCOMM 1999, Session Archive, Sep. 9, 1999.

Gupta, P., et al., Packet Classification on Multiple Fields, Sep. 2, 1999, pp. 1-14.

Lakshman, T.V., et al., High-Speed Policy-based Packet Forwarding Using Efficient Multi-dimensional Range Matching, ACM 1998, pp. 203-214.

U.S. Appl. No. 10/072,824, entitled Method for Classifying Packets Using Multi-Class Structures, by Li et al., on Feb. 8, 2002.

U.S. Appl. No. 10/170,896, entitled Incremental Compilation for Classification and Filtering Rules, by Andrew McRae, on Jun. 13, 2002.

* cited by examiner

|  |  | 425 | 430 | 440 | 450 |  |  |  |
|---|---|---|---|---|---|---|---|---|
| 420a | access-list | 101 | deny | tcp | 192.100.0.0 | 255.255.0.0 | eq | smtp |
| 420b | access-list | 101 | permit | ip | 192.100.0.0 | 255.255.0.0 |  |  |
| 420c | access-list | 101 | permit | ip | 192.101.0.0 | 255.255.0.0 |  |  |
| 420d | access-list | 101 | deny | tcp | any | any | eq | 21 |
| 420e | access-list | 101 | deny | udp | any | any | eq | 80 |

COMPILATION OF ACCESS CONTROL LISTS

CROSS-REFERENCE TO RELATED APPLICATIONS

This application claims priority to Indian Application No. 2194/Del/2005 entitled Compilation of Access Control Lists filed on Aug. 17, 2005.

The present invention is related to the following commonly assigned U.S. Patent Applications, the contents of which are hereby incorporated by reference:

Ser. No. 09/557,480 entitled Method for High Speed Packet Classification, by Andrew McRae filed Apr. 24, 2000, and now issued as U.S. Pat. No. 6,970,462 (McRae1);

Ser. No. 10/170,896 entitled, Incremental Compilation for Classification and Filtering Rules by Andrew McRae filed Jun. 13, 2002, and now issued as U.S. Pat. No. 7,236,493 (McRae2); and Ser. No. 10/072,824 entitled, Method For Classifying Packets Using Multi-Class Structures, by Liang Li et al filed Feb. 8, 2002, and now issued as U.S. Pat. No. 7,154,888 the contents of which are hereby incorporated by reference.

FIELD OF THE INVENTION

This invention relates to memory usage in a turboACL arrangement for classifying packets received by a network router. The invention relates generally to the classification and/or filtering of data packets, and more specifically to the high speed filtering and/or classification of data packets. More particularly it relates to the division of tables used in compiling the classification tables into noncontiguous blocks

BACKGROUND INFORMATION

In a communications network, there is a well-recognized need to classify information units, such as packets, that are passed between the various network devices in the network, e.g., routers and switches, in order to support a wide range of applications, such as security control, packet filtering, Class of Service (CoS) and Quality of Service (QoS). Often in such networks, these network devices use access control lists (ACLs) to, inter alia, classify packets for these applications.

An ACL typically comprises an ordered list of access control entries (ACEs), i.e., rules, where each rule defines a pattern (criterion) that is compared with received packets. The pattern could specify a particular source or destination address, a protocol or some other field that is looked for in the packet. For example, the pattern might be defined to look for a specific protocol in the packet's header such as, the Transmission Control Protocol (TCP) or the Internet Protocol (IP). The pattern is used to determine if the rule applies to the packet. If the pattern is found in the packet, the rule is said to apply to the packet.

Associated with each rule is an action that specifies the act to be taken if the rule applies. In its simplest form, this action may be to allow the matched packet to proceed towards its destination, i.e., "permit," or to stop the packet from proceeding any further, i.e., "deny." Conversely, if there is no match to any of the ACL's rules, the action may be to drop the packet, i.e., "a final deny." In a more sophisticated form, complex policies and filtering rules may be implemented in the ACL to determine the course of the data packet.

Typically, a packet is classified by searching for the first rule in the ACL that applies to the packet. The number of rules involved and the amount of processing time needed to make this determination often depends on the approach taken. For example, one approach would be to run through the list of rules starting from the first rule in the list and continuing towards the last rule in the list until a matching rule, i.e., a rule that applies to the packet, is found. This approach is simple, but is not very efficient. For example, the time spent processing each packet may vary depending on the packet. Packets that meet the criteria associated with rules earlier in the list will be processed faster than packets that meet criteria associated with rules that are positioned farther down the list.

One approach to obtaining an overall faster processing of packets is to predetermine the frequency of the matching of the various rules and to place the most selected rules at the top of the list. However, this method is highly dependent on the packet mix and is not very efficient should this mix change. Another approach is to implement a technique whereby packets are classified using a predetermined number of lookup operations such as described in McRae1.

McRae1 describes a technique whereby a packet's header is divided into sections. These sections are applied to a hierarchy of lookup tables that represent all possible combinations of matching rules for all values of the packet header sections to determine an outcome such as, e.g., a first matching rule that applies to the packet. These lookup tables must exist before a packet can be classified. Computing resources, such as processor time and memory, needed to generate these lookup tables depends in part on the number of rules in the ACL. Generally, as the number of rules in the ACL increases, the computing resources needed to build and hold the lookup tables increases. In systems where computing resources are limited, the number of rules that the technique can support may be limited due to the limited resources available.

McRae2, discloses an arrangement in which successive lookup tables, after the first set of tables, are compiled at runtime in response to the characteristics of packets being classified. This materially reduces compilation time and also saves memory space corresponding to classification rules that are not needed for the packets entering the router. The arrangement described in McRae1 is often termed "TurboACL," as is the related arrangement described in McRae2.

However, with the ever-increasing number of classification rules and the increasing diversity of packet characteristics, available memory space is still a problem. A table below the top level may require a very large block of contiguous memory locations. This may stall compilation because of a limitation of memory recourses.

SUMMARY OF THE INVENTION

The invention alleviates the memory space problem by dividing lower level tables into noncontiguous blocks, each of which may be located anywhere in the memory space. In the prior arrangements a pair of indexes was used to enter a location in a single contiguous table. Instead, we use one of the two indexes as a pointer to one of the blocks into which the table is divided and we use the other index to identify the entry within that block.

The invention improves compilation speed of the table entries by the use of aggregate bit vectors and by alignment of bit vectors and aggregate bit vectors with cache boundaries. Each bit vector is divided into sections. Each section is represented by one bit in an "aggregate bit vector" (ABV). Each bit in the ABV is set if, and only if, at least one bit is set in the corresponding section of the bit vector. ABV usage reduces the number of memory reads made by the TurboACL algorithm.

The invention handles Table overflow conditions and memory allocation failures gracefully. A table overflow condition is encountered when there is no free entry available in a lookup table for a new packet. In the prior arrangements the table overflow condition is handled by rebuilding the tables. TurboACL table rebuilding takes substantial CPU resources and frequent TurboACL table rebuilding has the potential to adversely affect functioning of the network device. To alleviate this problem, we pass all packets encountering a table overflow condition to an optimized packet classification path and allow rebuild of the tables only after a predefined period of time. The new optimized packet classification path for overflow traffic uses the TurboACL algorithm data structures and takes up classification of packets from any level in the TurboACL structure.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4 is an example of an access control list that can be used with the present invention;

DETAILED DESCRIPTION OF AN ILLUSTRATIVE EMBODIMENT

Figure 1:
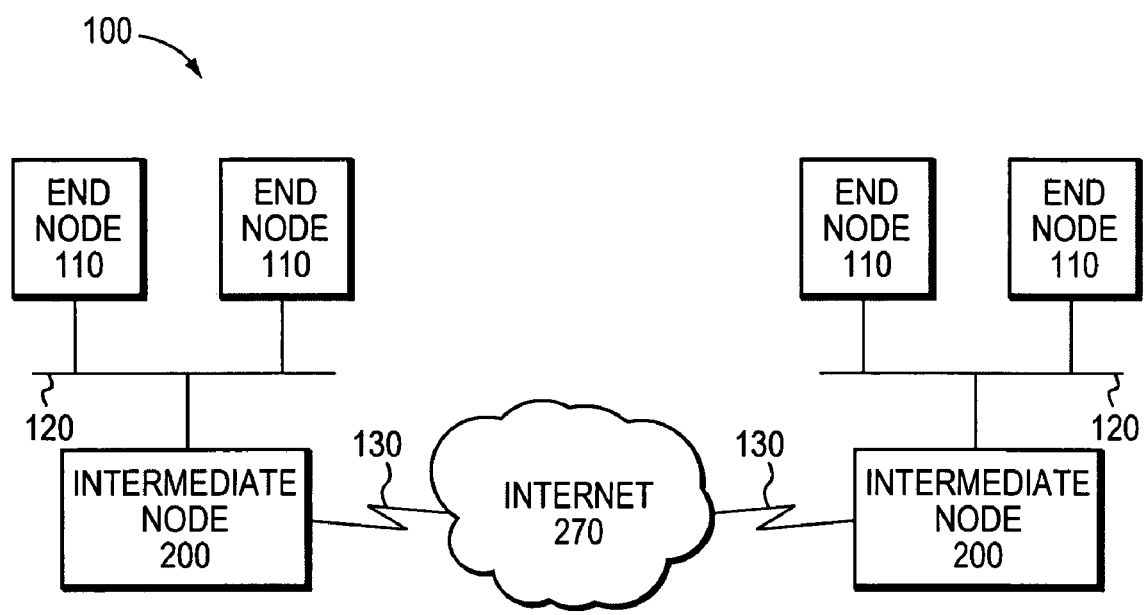
FIG. 1 is a schematic block diagram of a network that can be advantageously implemented with the present invention.

FIG. 1 is a schematic block diagram of a computer network 100 that can be advantageously used with the present invention. The computer network 100 comprises a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes 200, such as network switches or routers, to form an inter-network of computer nodes. These internetworked nodes communicate by exchanging data packets according to a predefined set of protocols, such as the Transmission Control Protocol/Internet Protocol (TCP/IP) and the Asynchronous Transfer Mode (ATM) protocol.

Figure 2:
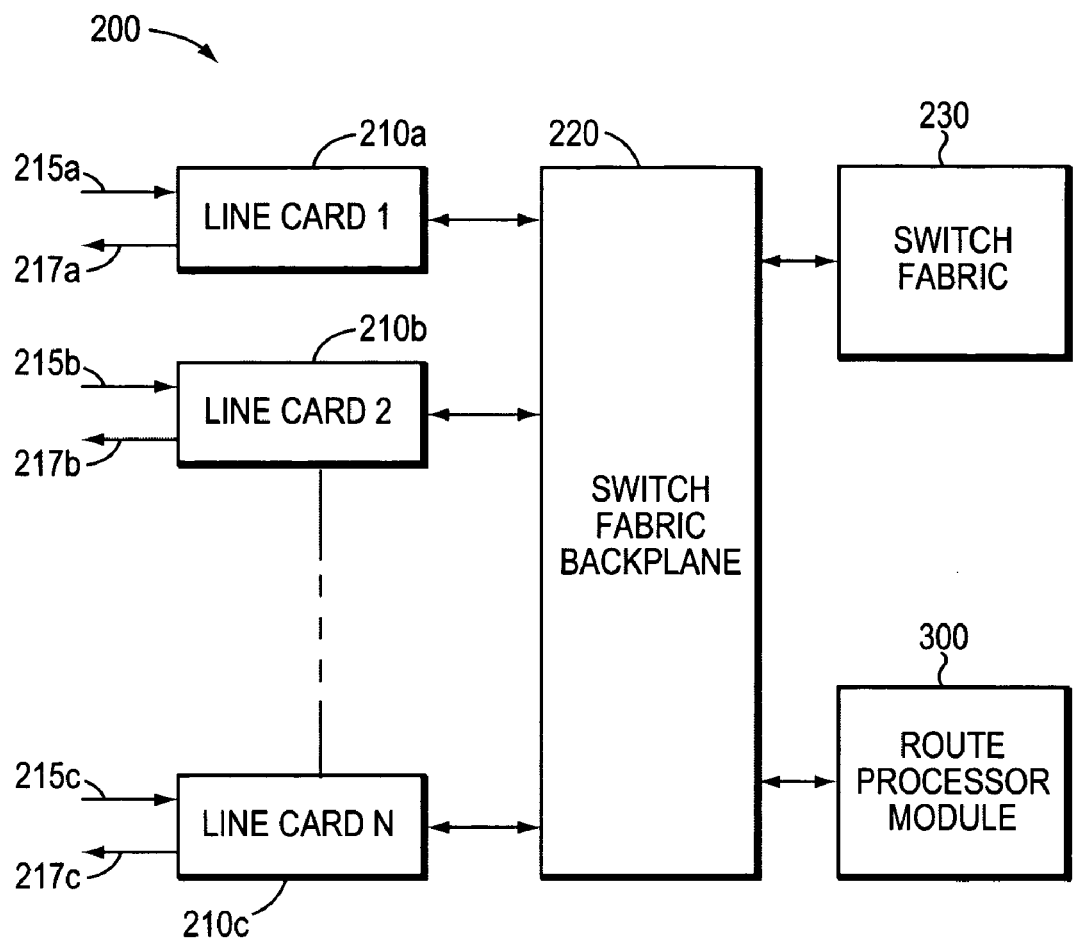
FIG. 2 is a partial schematic block diagram of an intermediate node that can advantageously implement the present invention.

FIG. 2 is a partial block diagram of a typical intermediate node (switch) 200 that can advantageously implement the present invention. An example of an intermediate node 200 that could be used in the computer network 100 is the Cisco MGX 8850 IP+ATM Multiservice Switch, available from Cisco Systems, Incorporated, San Jose, Calif. The MGX 8850 is designed for service providers deploying narrowband and/or broadband services. The MGX 8850 scales from DS0 to OC48c and supports various services, such as frame relay, ATM, Voice over IP, circuit emulation, IP, wireless aggregation, DSL aggregation, ATM service backbones and Virtual Private Networks (VPN's). The intermediate node 200 comprises a plurality of cards including line cards 210, a switch fabric card 230 and a route processor module 300 card interconnected by a switch fabric backplane 220.

The line cards 210 connect (interface) the switch 200 with the network 100. To that end, the line cards 210 receive and transmit data over the network through input 215 and output ports 217, respectively, using various protocols, such as OC-48c, DS0, T3 and so on. The line cards 210 also forward data received from the network to the switch fabric backplane 220, as well as transmit data received from the switch fabric backplane 200 to the network.

The switch fabric backplane 220 comprises logic and a backplane that provides an interface between the line cards 210, the switch fabric card 230 and the route processor module card 300. For example, the switch fabric backplane 220 provides interconnections between the cards that allow data and signals to be transferred from one card to another.

The switch fabric card 230 comprises switch fabric logic (switch fabric) that is configured to switch data between the cards coupled to the switch fabric backplane 220. For example, assume a packet is sent from a line card 210 to the switch fabric card 230. The switch fabric card 230 applies the packet header associated with the packet to the switch fabric logic and selects a destination card, such as the route processor card 300, that is to receive the packet. The packet is then switched to the destination card.

Figure 3:
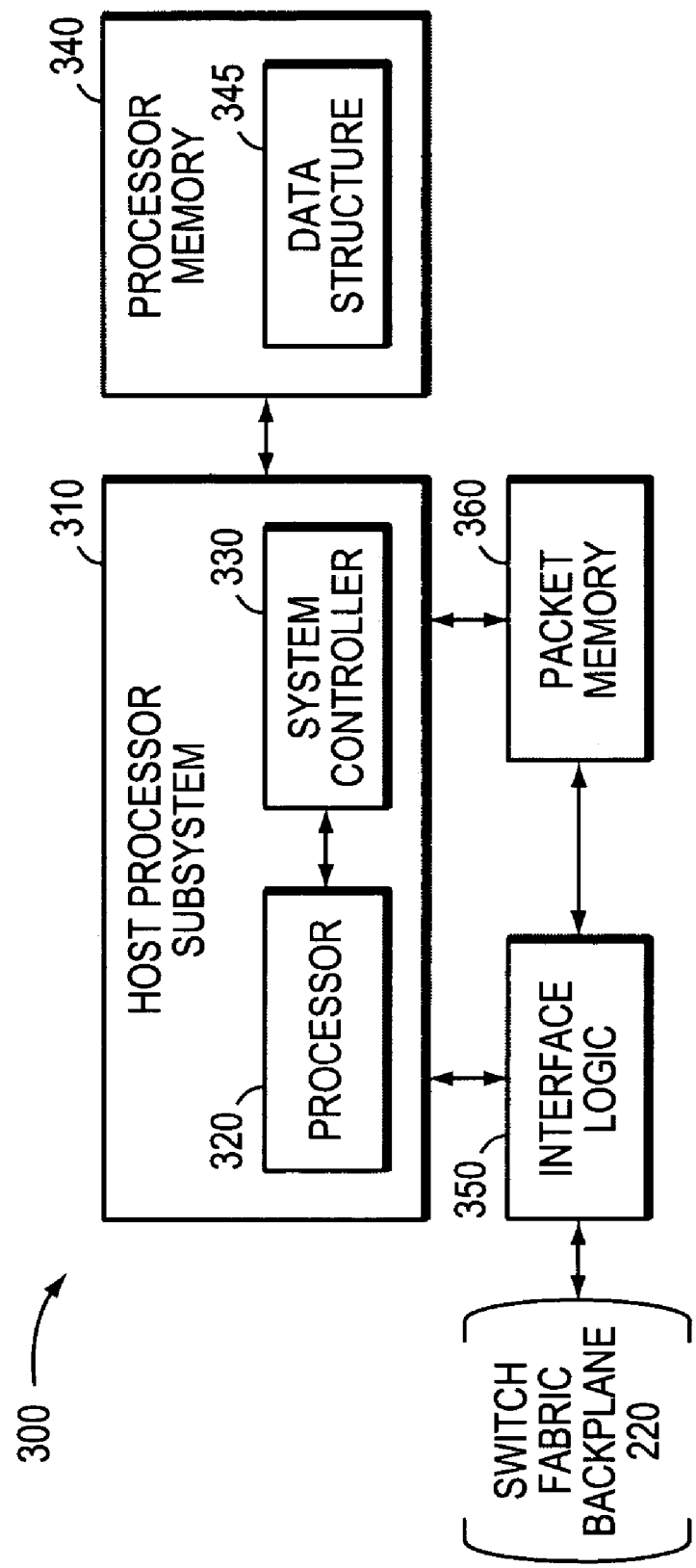
FIG. 3 is a partial schematic block diagram of a route processor module that can advantageously implement the present invention.

The route processor (RP) module 300 is adapted to provide, inter alia, layer 3 processing for incoming packets. FIG. 3 is a partial block diagram of the route processor module 300 comprising a host processor subsystem 310, processor memory 340, interface logic 350 and packet memory 360. The host processor 310 further comprises a processor 320 coupled to a system controller 330. The processor 320 comprises processing elements and logic that are capable of executing instructions and generating memory requests. An example of a processor that may be advantageously used with the route processor module 300 is the MIPS 10000 processor available from Silicon Graphics Incorporated, Mountain View, Calif. The system controller 330 is preferably embodied in a high performance Application Specific Integrated Circuit (ASIC), which is configured to interface the processor 320 with the processor memory 340 and the packet memory 360.

The processor memory 340 is a computer readable medium that holds executable instructions and data that are used by the processor 320 and enable (adapt) the processor 320 to perform various functions. These functions include methods for performing the present invention. The processor memory 340 comprises one or more memory devices (not shown) that are capable of storing executable instructions and data. Preferably, these memory devices are industry standard memory devices such as, Synchronous Dynamic Random Access Memory (SDRAM) devices available from Micron Technology, Inc., Boise, Id.

The interface logic 350 comprises hardware logic that, inter alia, provides an interface that allows data and signals to be transferred between the packet memory 360, the host processor 310 and the switch fabric backplane 220.

The packet memory 360 comprises memory devices (not shown) capable of storing packets received by the interface logic 350. Preferably, these memory devices are industry standard high-speed memory storage devices, such as Rambus Dynamic Random Access Memory (RDRAM) devices available from Rambus, Inc., Los Altos, Calif.

Broadly stated, packets are received from the network 100 by the line cards 210 and sent over the switch fabric backplane 220 to the switching fabric 230 for further processing. The switching fabric 230 examines header information contained in the packets and forwards the packets to the appropriate cards coupled to the switch fabric backplane 220. Packets destined for the route processor module 300 are received by the interface logic 350 and placed in the packet memory 360. The interface logic 350 informs the host processor 310 of the arrival of a packet. The processor 320 processes the packet in part by issuing requests to the system controller 330 to access the packet data stored in the packet memory 360. Further processing, including classifying the packet in accordance with the present invention, is performed by executing instructions and manipulating data stored in the processor memory 340. The processor memory 340 includes a data structure 345 for storing information that is used to classify the packets. Preferably, this data structure 345 is comprised of a hierarchical arrangement of lookup tables and equivalence sets that are configured using the techniques of the present invention.

Suppose, for example, a user wishes to create data structure 345 on network device 200 for use in classifying packets in accordance with an access control list (ACL). The user might begin by accessing network device 200 and entering a series of commands or statements to define the ACL. FIG. 4 illustrates a series of statements the user might enter to define this ACL. The ACL 400 contains a series of rules 420a-e each of which specify a directive 425, an access group number 430, an action 440 and matching criteria 450. The directive 425 directs the system to interpret the command as an ACE, i.e., rule. The access group number 430 defines the access group associated with the rule. The action 440 defines the action to be taken if the rule is found to apply to the packet being classified. The matching criteria 450 defines the criteria a packet must meet (match) in order for the rule to apply. Typically, packets are classified in accordance with an ACL by finding the first rule in the list that applies to the packet, then taking the action specified in the matching rule.

Figure 5:
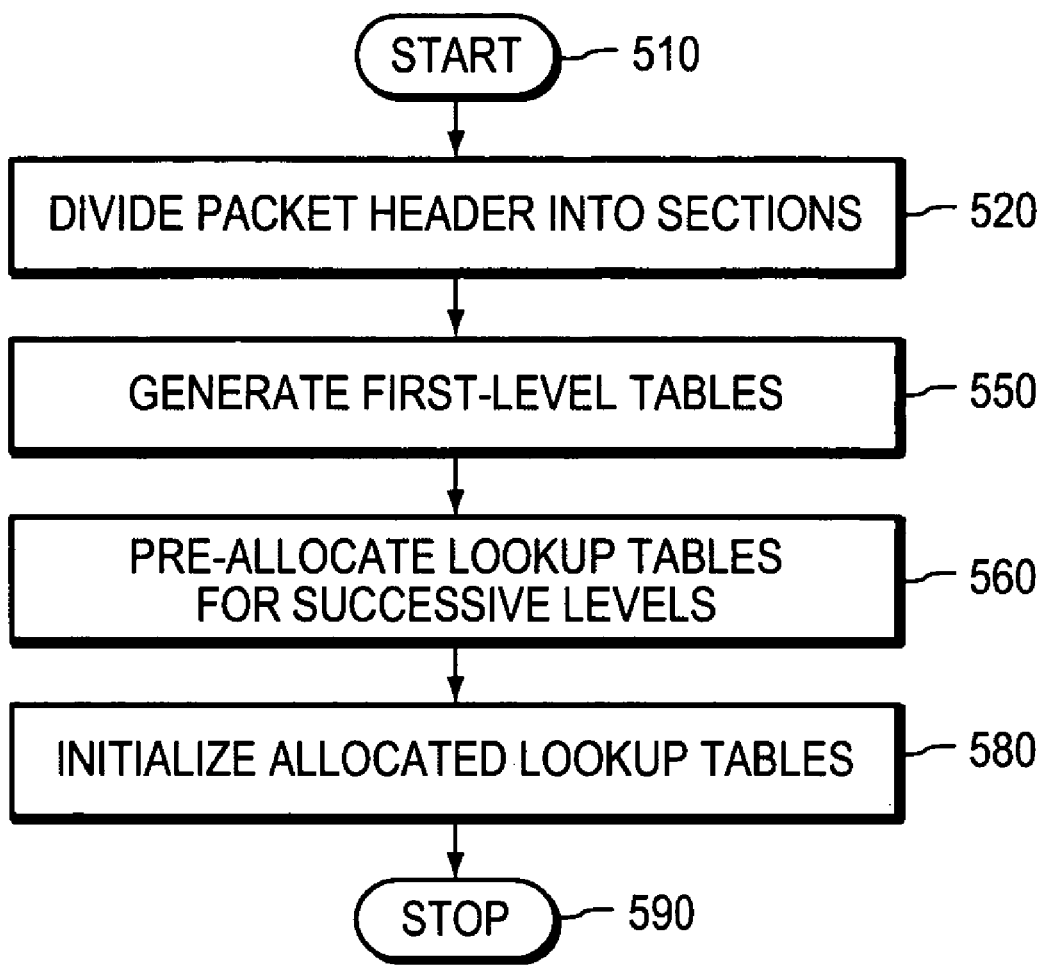
FIG. 5 is a high-level flow diagram of a sequence of steps that can be used to build a series of first-level lookup tables and allocate successive-level lookup tables in accordance with the present invention.

Now suppose the user wishes to direct network device 200 to create data structure 345 from the information specified in ACL 400. The user may enter a series of commands to direct device 200 to build data structure 345. FIG. 5 is a high-level flow diagram of a sequence of steps that network device 200 can use to create data structure 345. The sequence begins at Step 510 and proceeds to Step 520 where a template of the packet header is used to divide a packet's header into separate disjoint sections.

Figure 6:
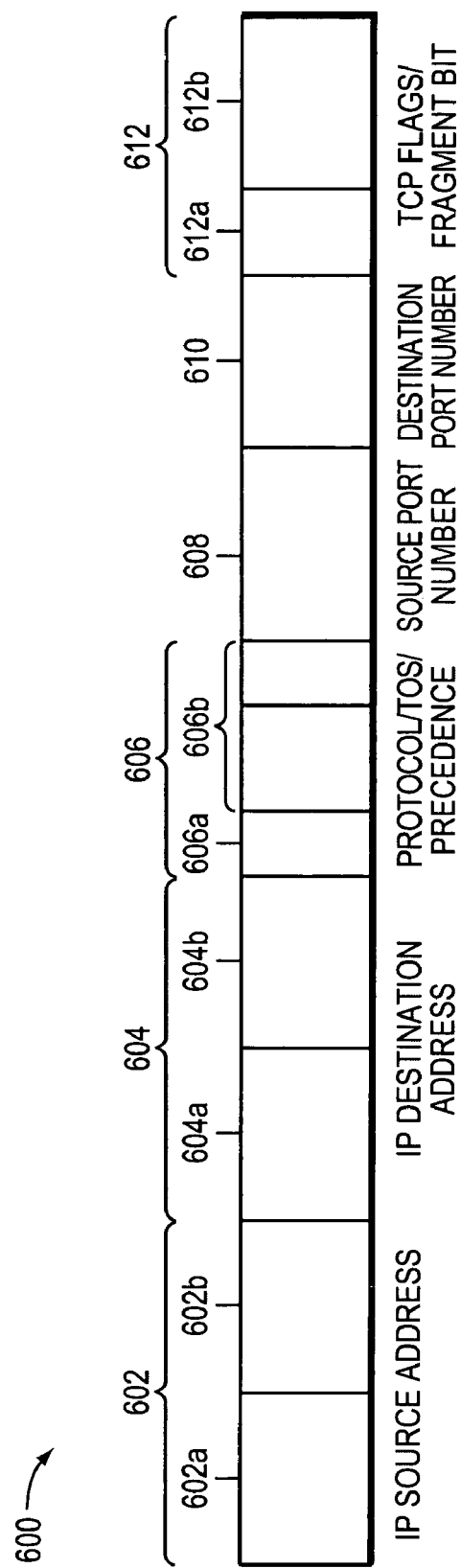
FIG. 6 is a packet header template that can be used to divide a TCP packet header into sections for use in forming first-level lookup tables and equivalence sets that can be used with the present invention.

FIG. 6 is a packet header template 600 that can be used to divide a TCP packet header in accordance with the invention. Packet header template 600 defines a plurality of fields including an IP source address field 602, an IP destination address field 604, a protocol field/type of service (TOS)/precedence field 606, a source port number field 608, a destination port number field 610, and a TCP flags/fragment bit field 612. Though the size of each section can vary, preferably, the length of each section is equal-sized. For example, template 600 divides a TCP header into eight 16-bit equal-length sections comprising sections 602a, 602b, 604a, 604b, 606, 608, 610 and 612. The IP source address 602 comprises two 16-bit sections that include the upper 16 bits of the IP source address section 602a and the lower 16 bits of the IP source address section 602b. Likewise, the IP destination address 604 comprises two 16-bit sections that include the upper 16 bits of the IP destination address section 604a and the lower 16 bits of the IP destination address section 604b. Section 608 comprises the source port number field and section 610 comprises the destination port number 610 field. Some smaller fields such as the protocol 606a and TOS/precedence 606b field are grouped together to form a 16-bit section 606. Likewise, the TCP flags field 612b is combined with the IP Fragment bit 612a to form a 16-bit section 612.

Taking one of these sections, such as the upper 16 bits of the IP source address section 602a, and applying it to the rules included in ACL 400, the following rule set illustrated in Table 1 can be formed where "0.0" represents "any value":

TABLE 1

| Rule Number | Value | Mask |
| --- | --- | --- |
| 1 | 192.100 | 255.255 |
| 2 | 192.100 | 255.255 |
| 3 | 192.101 | 255.255 |
| 4 | 0.0 | 0.0 |
| 5 | 0.0 | 0.0 |

From this rule set an "equivalence set" can be formed. Basically, an equivalence set is a set of unique values that exist across all rules for a particular packet header section. For each entry in the equivalence set, an indication (matching rule bitmap) is kept for those rules associated with the entry, the rationale being that a packet section value may appear in more than one rule. For example, ACL 400 contains five rules, thus each matching rule bitmap is five bits in length (i.e., one bit for each rule). The value "192.100/255.255" appears in both rules 1 and 2 above, thus, the matching rule bitmap value associated with this value is "11000." By using a matching rule bitmap, rules associated with each equivalence set entry may be tracked. Each unique matching rule bitmap value is further assigned an equivalence set index value. So for the example above, the following equivalence set, shown in Table 2, is created:

TABLE 2

| Value/Mask | Equivalence Set Index | Matching Rule Bitmap 12345 |
|---|---|---|
| 0.0/0.0 | 1 | 00011 |
| 192.100/255.255 | 2 | 11011 |
| 192.101/255.255 | 3 | 00111 |

By comparing Table 1 with Table 2, one can see that compression has taken place in that out of the five rules within this section there are only three possible outcomes, i.e., equivalence set index entries 1, 2 and 3. Thus, after determining how many unique intervals there are in the section value range from zero to 65535, the preliminary equivalence set reduces the original rules down to a minimal data set. This concept is used to build is the first-level lookup tables that map each 16-bit section value to a smaller index value.

Figure 7:
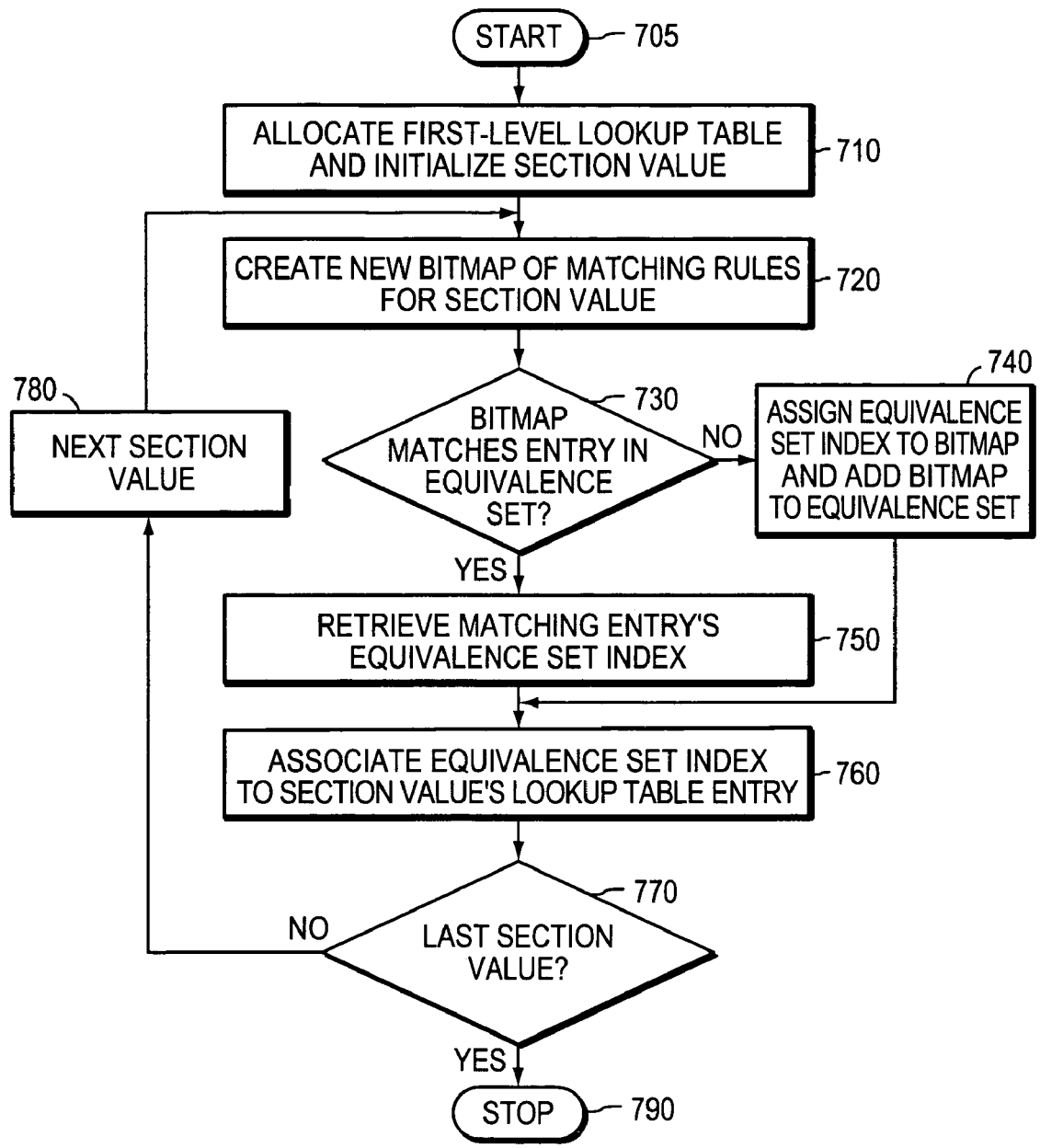
FIG. 7 is a flow diagram of a sequence of steps that can be used to create a series of first-level lookup tables in accordance with the present invention.

Referring again to FIG. 5 Step 550, the first-level lookup tables and equivalence sets are built for each of the sections. Preferably each first-level lookup table is organized as a one-dimensional array that is indexed by a section value and each entry is configured to hold an index value. Likewise, each equivalence set is organized as a one-dimensional array that is indexed by an index value and each entry is configured to hold a bitmap that represents a set of matching rules, i.e., matching rule bitmap. FIG. 7 is a flow diagram illustrating a sequence of steps that can be used to build the first-level lookup table and equivalence set for a section. Basically, the sequence iterates through all possible section values and associates the section value with an equivalence-set entry.

The sequence begins at Step 705 and proceeds to Step 710 where the first-level lookup table associated with the section is allocated and the section value is initialized to a starting value, preferably zero. Next at Step 720, a new matching rule bitmap that represents the matching filter rules associated with the section value is created. A more detailed description as to how this new matching rule bitmap is created will be described below. At Step 730, the equivalence set is searched to determine if an entry exists that matches the new matching rule bitmap. If a matching entry is not found, the sequence proceeds to Step 740, where a new entry containing the new matching rule bitmap is added to the equivalence set and a new equivalence set index is associated with the entry; otherwise, the sequence proceeds to Step 750 where the equivalence set index associated with the matching value is retrieved. At Step 760, the equivalence set index is then associated with the lookup table entry associated with the section value. Next at Step 770, a check is performed to determine if the section value is the last section value to be processed. If not, the next section value is calculated as indicated at Step 780 and the sequence returns to Step 720; otherwise, the sequence proceeds to Step 790 where the sequence ends. Steps 720 to 780 are repeated until all of the section values from the starting value to the last value have been processed. For example, for a 16-bit section Steps 720 to 780 are repeated for all section values from zero to 65535.

Figure 8:
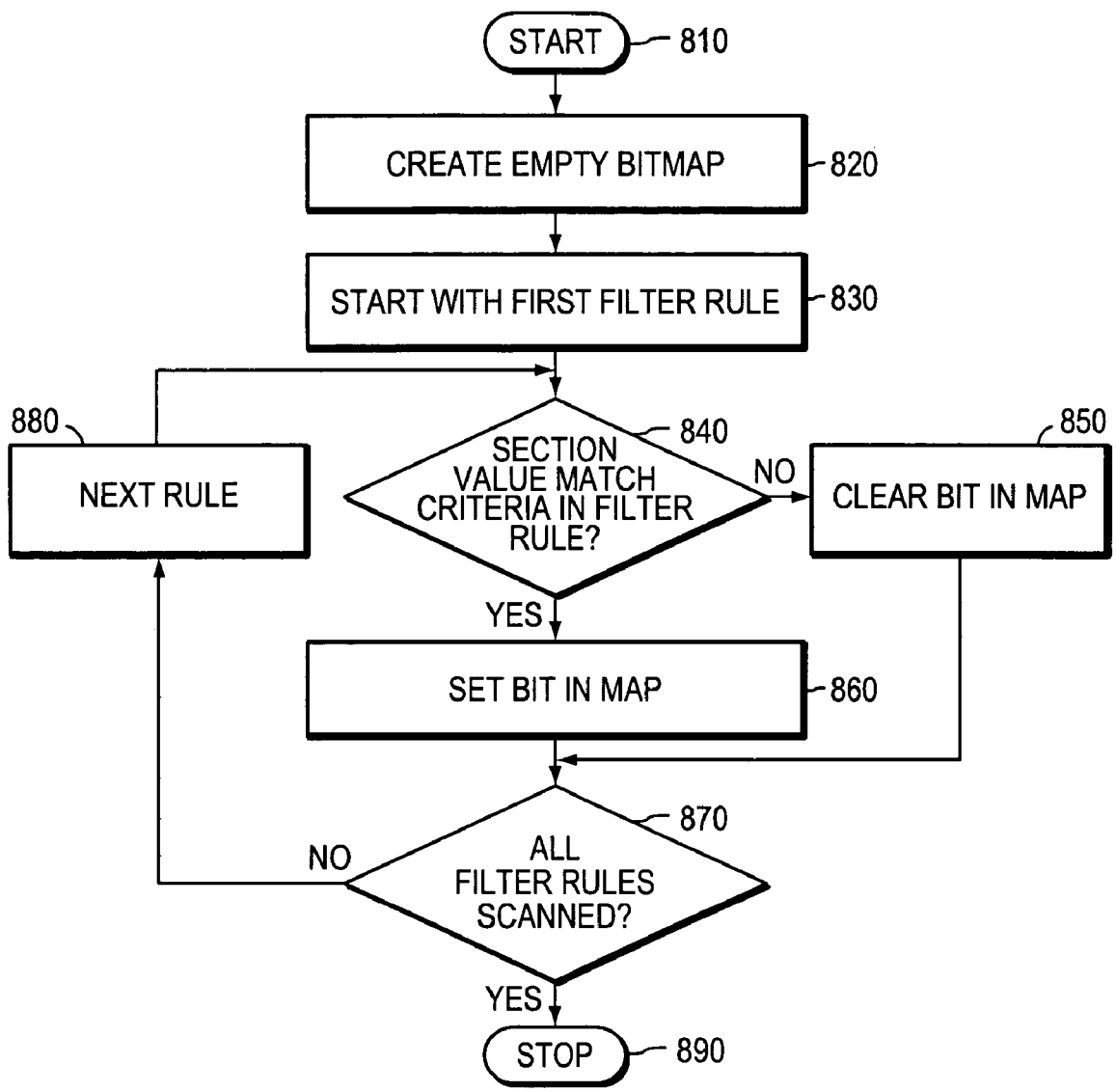
FIG. 8 is a flow diagram of a sequence of steps that can be used to create a matching rule bitmap associated with a section value that can be used advantageously used with the present invention.

FIG. 8 is a flow diagram of a sequence of steps that can be used to create a matching rule bitmap for a given section value from the matching rules contained in the ACL. The sequence begins at Step 810 and proceeds to Step 820, where an empty bitmap is created. Preferably, this bitmap comprises at least one bit for each of the matching rules. Next at Step 830, starting with the first matching rule the section value is compared to the matching rule's criteria to determine if the section value matches the rule criteria i.e., the rule applies to the particular section value, as indicated at Step 840. If the rule applies, the sequence proceeds to Step 860 where the bit associated with the rule in the bitmap is set; otherwise, the sequence proceeds to Step 850 where the associated bit is cleared. A check is then performed to determine if all of the matching rules have been processed, as indicated at Step 870. If not, the sequence proceeds to Step 880 where the next matching rule is located, and then returns to Step 840. Steps 840-880 are repeated until all of the matching rules have been processed, at which point the sequence ends (Step 890).

Table 3 illustrates the first-level lookup table and equivalence set that is created when the above techniques are applied to the packet header section associated with the upper 16 bits of the source IP address for ACL 400.

TABLE 3

| Packet Header Section Value | Equivalence Set Index | Matching Rule Bitmap 12345 |
|---|---|---|
| 0 to 49251 and 49254-65535 | 1 | 00011 |
| 49252 | 2 | 11011 |
| 49253 | 3 | 00111 |

The above sequences are further applied to create the first-level lookup tables and equivalence sets for each of the eight sections associated with the packet's TCP header template, thus yielding eight first-level lookup tables. Table 4 illustrates the first-level lookup table and equivalence set that is created when the above sequences are applied to the section associated with the lower-sixteen bits of the IP source address for ACL 400.

TABLE 4

| Packet Header Section Value | Equivalence Set Index | Matching Rule Bitmap 12345 |
|---|---|---|
| 0 to 255 and 257 to 65535 | 1 | 00011 |
| 256 | 2 | 11111 |

Referring again to FIG. 5, at Step 560, lookup tables are pre-allocated for each successive level beyond the first level in the lookup-table hierarchy. In the example above, there are eight first-level lookup tables. The equivalence sets associated with these tables are merged, in a manner as will be described below, to form four second-level lookup tables and equivalence sets. The second-level equivalence sets are, in turn, merged to form two third-level lookup tables and equivalence sets, the latter of which are likewise merged to form a single fourth (final) level lookup table and equivalence set. Thus in the above example at Step 560, seven lookup tables in total are pre-allocated for successive levels two through four. Preferably these lookup tables are two-dimensional arrays that are indexed by index values held by the lookup tables of the previous level and each of the entries in the successive-level lookup table is configured to hold an index value.

The size of each allocated successive-level lookup table depends on the number of entries in the table and the size of each entry. The size of each entry should be large enough to hold an index value. The maximum number of entries in the successive-level lookup table can be determined by multiplying the number of entries in the two prior-level equivalence sets being merged. For example, in the above-described example the first-level equivalence set for the upper sixteen bits of the IP source address contains three entries and the first-level equivalence set for the lower sixteen bits of the IP source address contains two entries. Thus, the maximum number of entries in the second-level equivalence set is six.

At Step 580, each entry in the allocated successive-level lookup tables is initialized, preferably to zero, to indicate that the entry is "missing," i.e., it is empty and does not contain a valid index value. The sequence then ends at Step 590.

Figure 9:
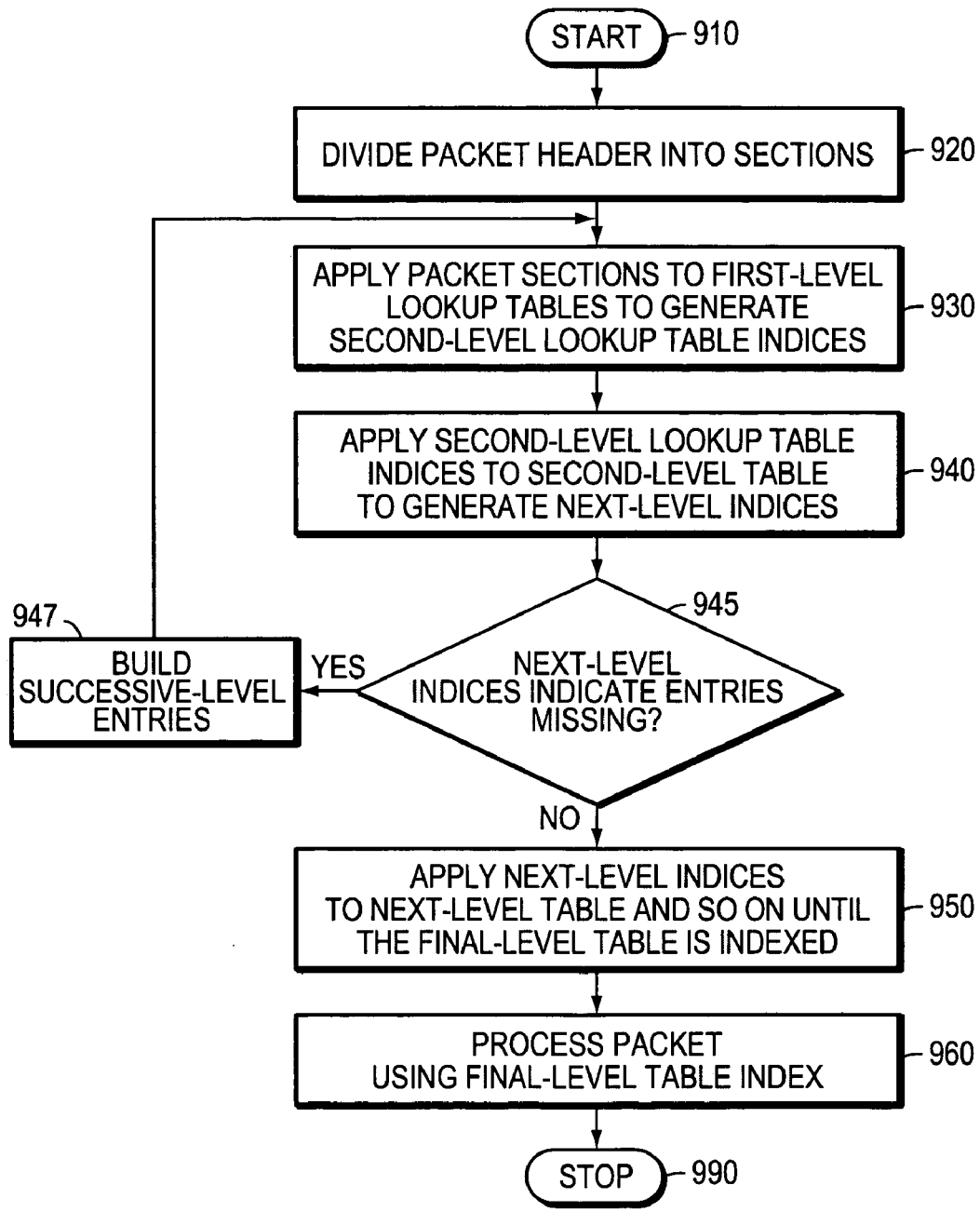
FIG. 9 is a high-level flow diagram of a sequence of steps that can be used to classify a packet in accordance with the present invention.

FIG. 9 is a flow chart of a sequence of steps that can be used to classify a packet in accordance with the present invention. The sequence begins at Step 910 and proceeds to Step 920 where a network packet's header is sectioned as described above. Next at Step 930, each section is applied to their respective first-level lookup table to generate a set of second-level lookup table index values. These second-level indices are then applied to the second-level lookup table to generate the next-level indices associated with the next level of lookup tables, if any, in the hierarchy, as indicated at Step 940. At Step 945, a check is performed to determine if the next-level indices indicate that the second-level lookup table entries are missing, which in the preferred embodiment means the next-level index values are zero. If so, the sequence proceeds to Step 947 where the successive-level, i.e., second-level and beyond, lookup table and equivalence set entries associated with the section values are built.

Basically, a successive-level equivalence set entry is built by calculating the cross-product of the equivalence-set entries from the prior level. Cross-producting is a technique whereby two entities are logically ANDed to produce a cross-product. For example, assume a bitmap B1 contains the value "00111" and a bitmap B2 contains the value "11110". The cross-product of these bitmaps is calculated by logically ANDing the value of B1, i.e., 00111, with the value of B2, i.e., 11110, which results in the value "00110". Once the successive-level equivalence-set entry is built, the associated lookup-table entry for that level is derived from information in the equivalence-set entry.

Figure 10:
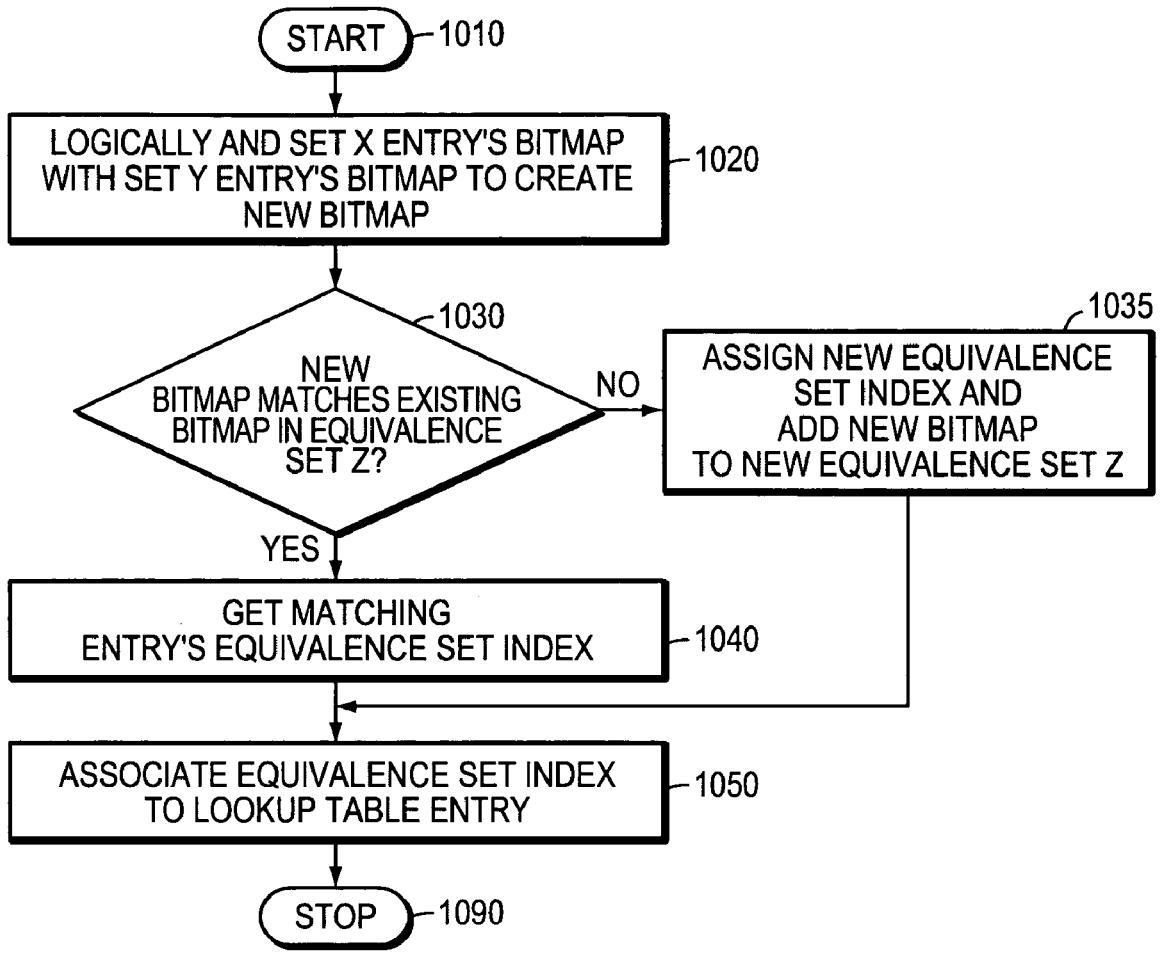
FIG. 10 is a flow diagram of a sequence of steps that can be used to merge two equivalence-set entries to form a new equivalence-set entry and lookup-table entry.

FIG. 10 is a flow diagram of a sequence of steps that can be used to build successive-level equivalence sets and associated lookup table entries. Assume equivalence set "X" and "Y" are equivalence sets from a prior level and that equivalence set "Z" is an equivalence set that is associated with a next-level lookup table. Assume further that an entry in equivalence set "X" associated with a first lookup table index is to be merged with an entry in equivalence set "Y" that is associated with a second lookup table index to form a bitmap contained in equivalence set "Z" whose index is associated with the next-level lookup table entry being built, i.e., the entry in the next-level lookup table selected by the combination of the first and second lookup table indices. The sequence begins at Step 1010 and proceeds to Step 1020 where equivalence-set "X" entry's matching rule bitmap is logically ANDed with equivalence-set "Y" entry's matching rule bitmap to produce a new matching rule bitmap that is the cross-product of these two entries. At Step 1030, equivalence set "Z" is searched to determine if an entry exists that matches the new matching rule bitmap. If a matching entry is not found, the sequence proceeds to Step 1035, where the new matching rule bitmap is assigned a new equivalence-set index and placed in equivalence set "Z" at the location selected by the newly assigned index. Otherwise, the sequence proceeds to Step 1040 where the equivalence-set index associated with the matching value is fetched. Next at Step 1050, the equivalence-set index value is associated with the next-level lookup table entry being built. In so doing, the matching rule bitmap is associated with the next-level lookup table entry. The sequence ends at Step 1090.

Figure 11:
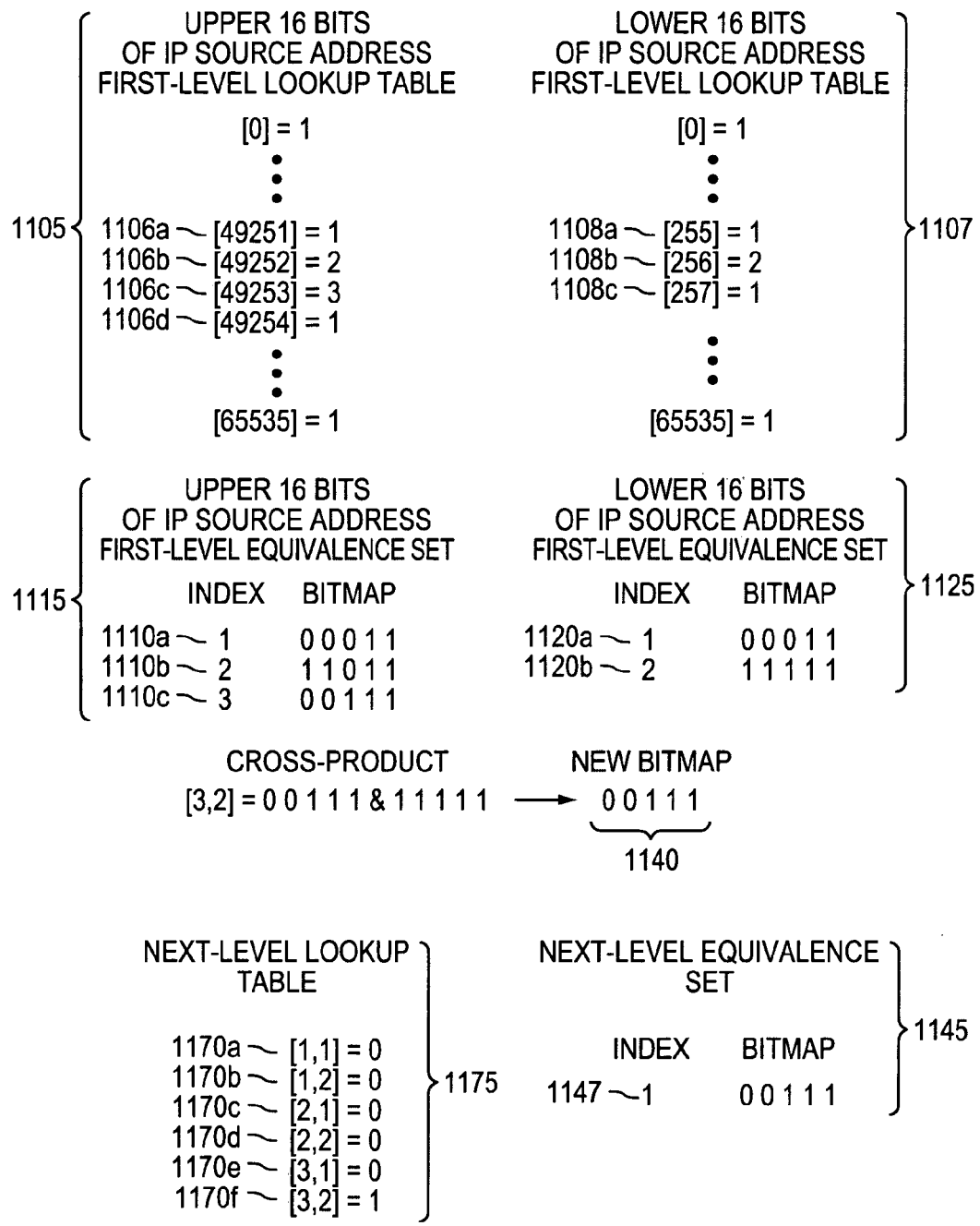
FIG. 11 is an example of the merging of two first-level bitmaps to generate a next-level equivalence-set entry and lookup-table entry.

FIG. 11 illustrates the building of the second-level lookup table and equivalence set entries for the upper and lower 16-bit sections of the IP Source Address of a TCP packet using the above-described techniques. Assume a packet containing an IP source address 192.101.1.0 is being classified. Further assume, the first-level lookup tables and equivalence sets for the sections have been built and the second-level lookup table has been allocated, as described above, and the second-level equivalence set contains no entries. The upper 16 bits of the packet's IP Source Address, i.e., 49253, applied to its section's first-level lookup table 1105 selects entry 1106*c* and yields a second-level index value of 3, which is associated with entry 110*c* in first-level equivalence set 1115. Likewise, the lower 16 bits of the packet's IP Source Address, i.e., 256, applied to its section's first-level lookup table 1107 selects entry 1108*b* and yields a second-level index value of 2, which is associated with entry 1120*b* in first-level equivalence set 1125. The matching rule bitmap values associated with entries 1110*c* and 1120*b* are then cross-producted, as described above, to produce a new matching rule bitmap 1140. Since the second-level equivalence set 1145 contains no entries, as indicated above, there are no entries that match the bitmap 1140, thus, bitmap 1140 is assigned a new index, i.e., "1," and placed in the equivalence set 1145 at entry 1147 associated with this new index. Next, entry 1147 is associated with the second-level lookup table entry 1170*f* that is associated with the combined second-level indices, i.e., [3,2], by associating the new index with entry 1170*f*.

Figure 12:
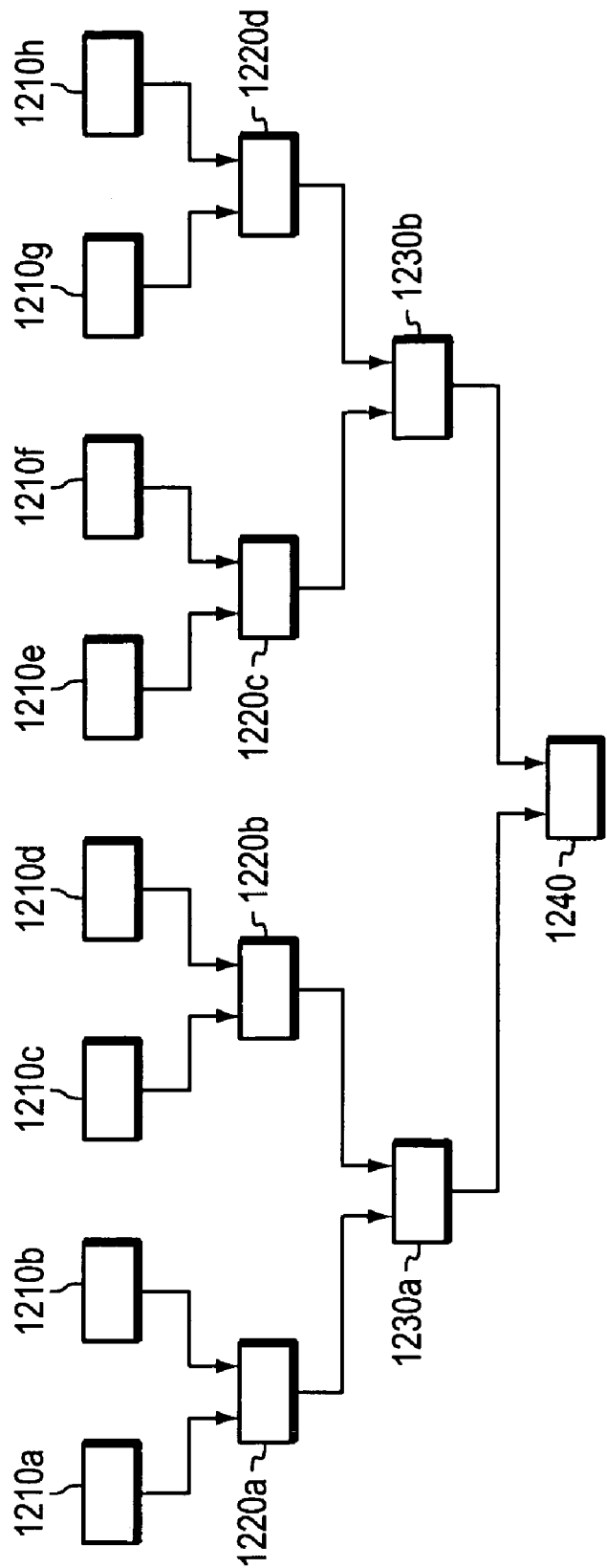
FIG. 12 is an example of how equivalence sets can be merged to form successive-level equivalence sets.

The above-described cross-producting technique is applied continually for each level in the lookup-table hierarchy. FIG. 12 illustrates the merging process as applied to the lookup-table hierarchy for a packet header that is divided into eight sections. Here all eight first-level equivalence-set entries associated with a packet's section values are merged to form four second-level-table and equivalence-set entries. Likewise, these second-level equivalence-set entries are merged to form two third-level table and equivalence-set entries. These third-level equivalence sets, in turn, are merged to form a single fourth-level final lookup table and equivalence set. The end result is a 4-level hierarchy of lookup-table entries and a final-equivalence set that can be used to classify the packet.

Referring again to FIG. 9, after the successive-level entries have been built, the sequence returns to Step 930 and eventually progresses to Step 945, where the next-level indices are examined to determine if they are missing, i.e., zero. Since, as described above, the indices are not zero the sequence proceeds to Step 950 where the next-level indices are applied to the next-level tables to generate indices that are then applied to the next successive level of tables and so on until an index is generated from the final-level table. At Step 960, this index is then used to further process the packet. This processing could include, for example, applying the index to a results table to determine the first matching rule associated with the packet. At Step 990 the sequence ends.

Figure 13:
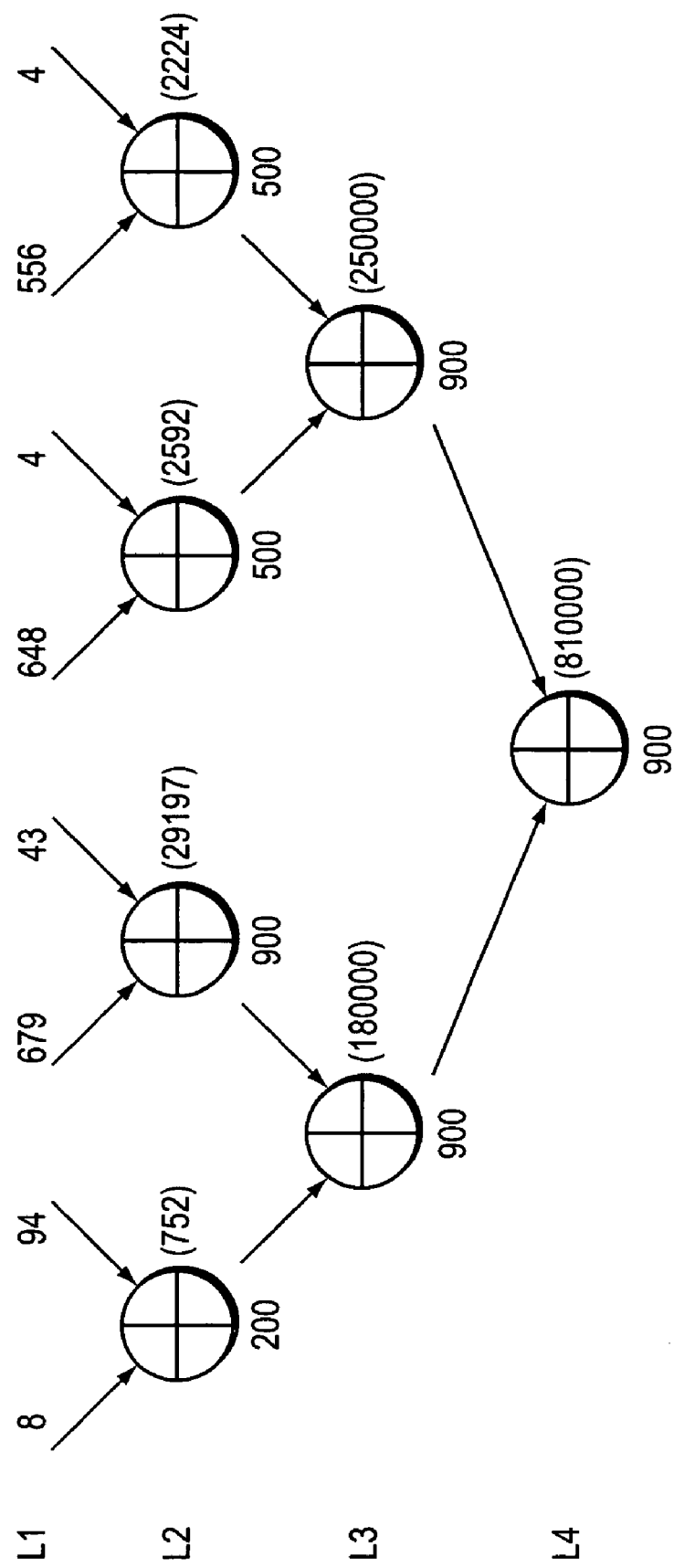
FIG. 13 is an example of a lookup table hierarchy containing estimated lookup-table sizes.

Although the above-described arrangement pre-allocates a lookup table whose size is based on the product of the number of entries in the prior-level tables, other arrangements may use other sizes. For example, the size of each pre-allocated lookup table may be based on an estimate. FIG. 13 illustrates a series of lookup tables whose size are based on an estimated value rather than a maximum value. Note that the values for level L1 are actual values. The values represented in parenthesis are maximum values. The non-parenthetic values for levels L2 through L4 are the actual values of the tables, which are estimates. In this embodiment, when a packet is classified, if the first-level indices point to a successive-level lookup table entry that is beyond the allocated table, new lookup tables are allocated using a larger estimated size and the successive-level entries are then built using the newly allocated tables.

The foregoing arrangement classifies packets in a manner that is both deterministic and efficient. It enables packets to be classified without having to completely build all the entries in the lookup tables used to classify the packets. Rather entries are built incrementally as they are used to classify packets. Advantageously, this enables packets to be deterministically and efficiently classified without requiring that all possible outcomes be determined before packet classification can take place, thereby saving time and computing resources.

Figure 14:
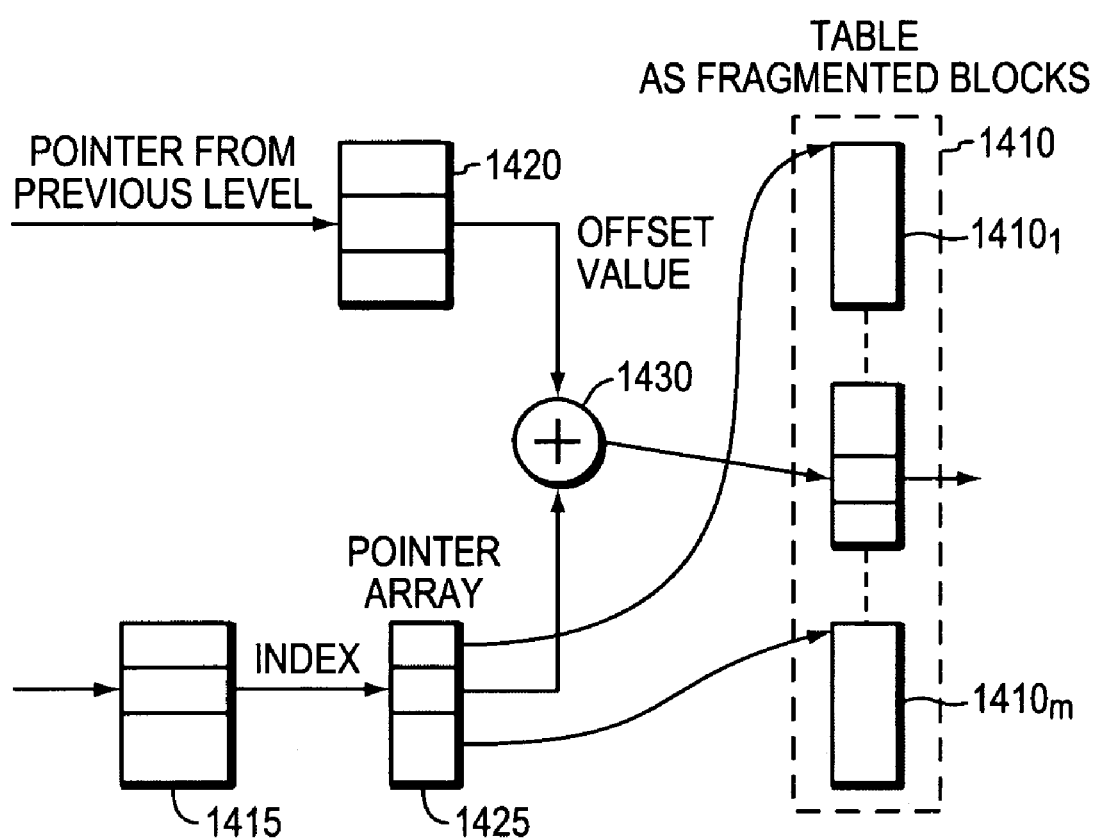
FIG. 14 is a diagram of a an arrangement in which an equivalence table is fragmented into non-contiguous blocks.

In FIG. 14, we have illustrated an arrangement used in organizing the tables at levels below the second level. In accordance with invention, each table below the second level (e.g. table 1410 in FIG. 14) is divided into smaller blocks $1410_1 \ldots 1410_m$, which may be scattered throughout the memory space of the router thereby making use of memory space that would otherwise be unavailable for the building of classification tables. As in prior arrangements, each table is formed from a pair of higher level tables, in the example, tables 1415 and 1420. However the indexes from the table 1415 are applied to a pointer array 1425, which then points to one of the blocks 1410. The indexes from the table 1420 are not changed, except for being shifted so as to be offsets into the target blocks. The output of the pointer array 1425 and the shifted offset from the table 1420 are summed by a summer 1430, whose output thus provides a pointer to the correct location in one of the blocks of the fragmented table 1410.

Each of the table blocks $1410_1 \ldots 1410_m$ has the same internal arrangement as a non-fragmented table. Thus it includes an entry for each equivalence set of the table, a rule bit map for each equivalence set and an index for each entry, to be used when compiling a table at the next lower level and in accessing the tables to classify packets. It will be apparent that the number of blocks in the table 1410 will be equal to the number of equivalence ID's in the table 1415.

When the next-lower-level table is to be compiled, the operation is again the same as with a non-fragmented table. Accordingly, the bit maps in the blocks $1410 \ldots 1410_m$ are "cross-producted", i.e. ANDed, with the bit maps in another table at the same level.

Figure 15:
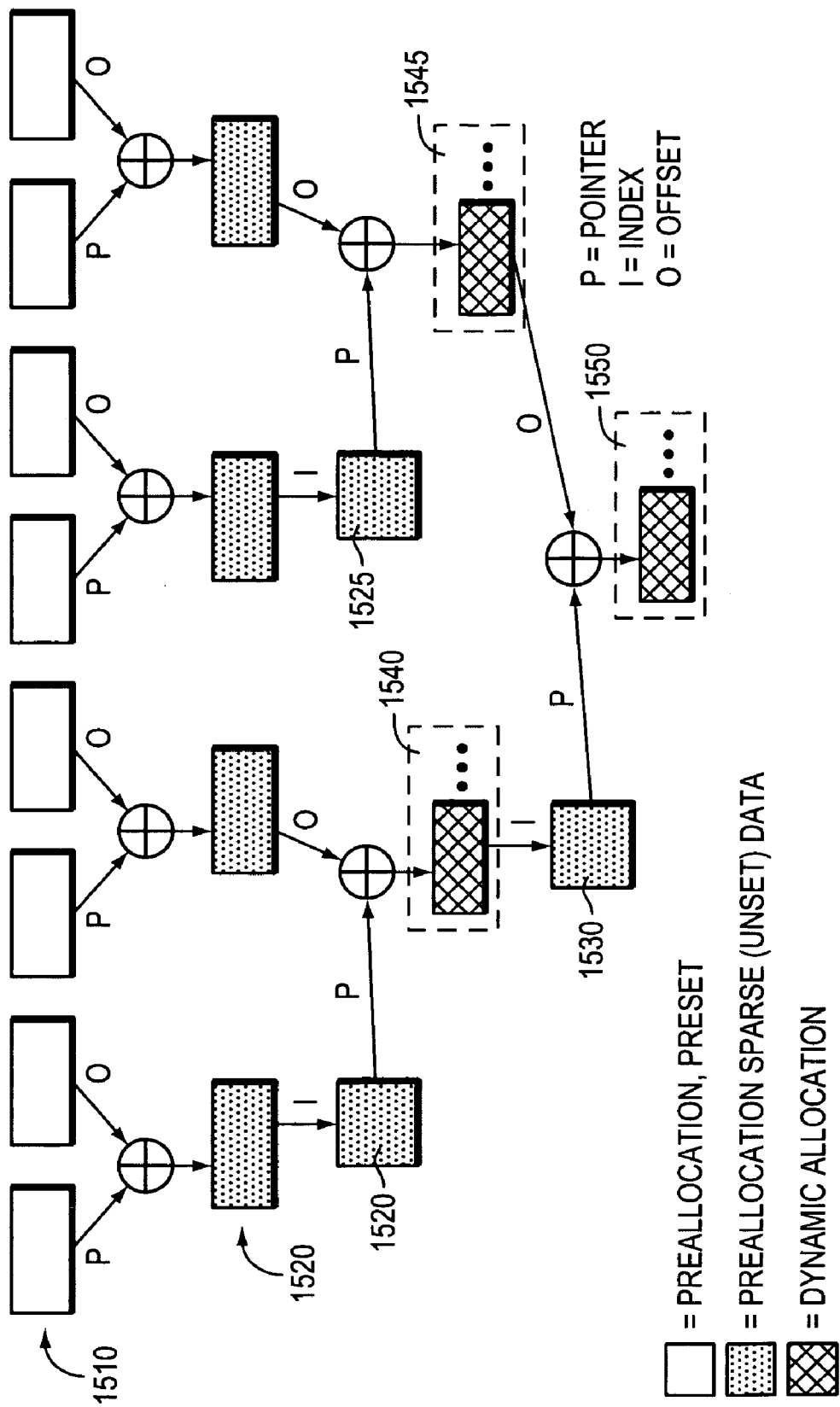
FIG. 15 is a diagram of a classification system incorporating the fragmented tables of FIG. 14.

The resulting arrangement is illustrated in FIG. 15. As shown therein, the top level 1510 of tables is pre-compiled. The memory spaces for the tables in the next level 1520 are pre-allocated, but empty, as are the pointer tables 1520, 1525 and 1530. The locations of the blocks that make up the fragmented tables 1540, 1545 and 1550, in the third and fourth levels are not yet allocated, since the number of blocks in each of these tables depends on the number of equivalence ID's that are applied to the pointer tables.

Even with table fragmentation, a denial-of-service (DOS) attack can flood a router with a large number of packets having disparate headers, requiring, even under incremental turbo ACL, repeated rebuilding of tables to accommodate the increased number of equivalence ID's (classes). The processor time devoted to rebuilds can greatly slow down the classification process. Moreover, the increased number of equivalence classes can use up available memory space.

To cope with this problem, our classification routines rebuild classification tables only when it is reasonably clear that a DOS attack is not underway. Specifically when there is a "table miss," tables are rebuilt only if a substantial length of time has elapsed since the previous rebuild:

If $t-t_0>RT$, then
rebuild table,
Else
pass bit vector along the classification route.
Where
t is the present time,
$t_0$ is the time of the last table rebuild, and
RT is the rebuild threshold time set by the operator.

If a bit vector is passed along the classification route, it is directly used for the next-level equivalence computation, without reference to the previously recorded classification ID's. The disadvantage of this approach is that all subsequent packets in the same packet stream will have to compute the resultant bit vector again. This will result in an overall increase in the number of memory accesses required for packet classifications. However, that increase is more than offset by the reduction in table rebuilds.

When the foregoing arrangement is used, table overflow can be indicated to software modules dependent on the TurboACL system by reserving an equivalence ID such as −1 or Ø.

The classification time is further reduced by the use of aggregate bit vectors, as described in Baboescu, et al, Scalable Packet Classification, Proceedings of the 2001 Conference on Applications, Technologies, Architectures, and Protocols for computer communications, SIGCOMM'01. Thus each bit vector used in TurboACL is divided into sections. Each section is represented by one bit in an aggregate bit vector (ABV). Each bit is set if, and only if, at least one bit is set in the corresponding section of the bit vector.

Instead of performing the intersection of two bit vectors in a table at the next lower level, the system performs the intersection of the corresponding ABV's, thereby reducing the computer time required for doing the intersections. To ascertain which classification rules are involved, the system examines the bit vector sections corresponding to the ABV bits that are set.

Figure 10A:
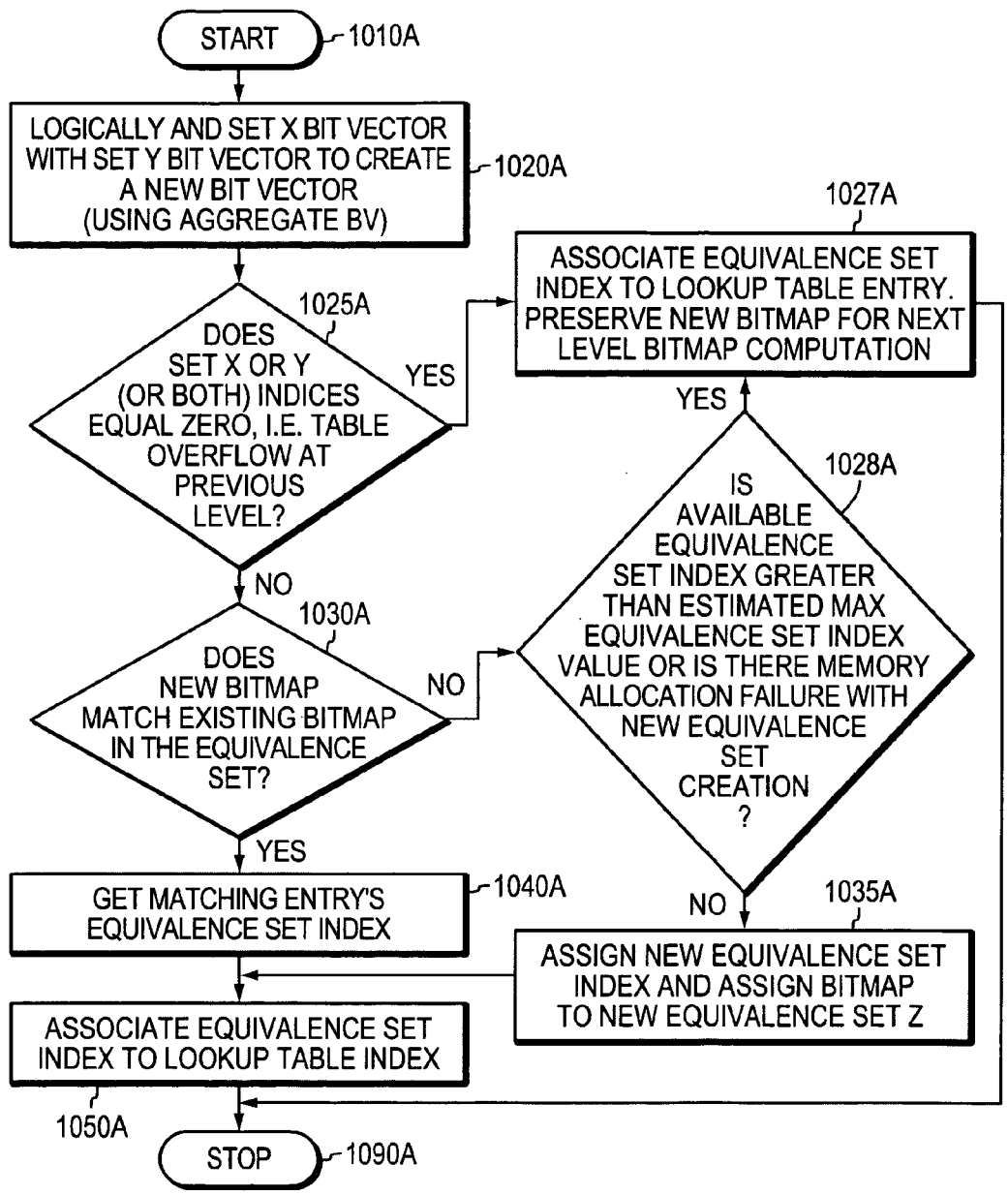
FIG. 10A is a modification of FIG. 10 to incorporate certain features of the invention.

Specifically, refer to FIG. 10A, which is a modification of FIG. 10 to incorporate the present invention. In step 1020A, the aggregate bit vectors in equivalence sets X and Y are ANDed to create the next level bit vectors which are converted to aggregate list vectors (ABV's). Next, in step 1025A the routine checks whether set X or Y equals zero, indicating a table overflow. If there is no overflow, the routine proceeds to step 1030A, in which it checks to see if the new bit map matches an existing bitmap. If it does, the matching entry's equivalence set index is retrieved (step 1040A) and the equivalence set is associated with the index (step 1050A).

At step 1025A, if there is an overflow at the previous level, the routine branches to step 1027A, where the equivalence set index zero is assigned to the entry and the new aggregate bit vector is preserved for next level bit map computation.

At step 1030A, if the new bitmap does not match an existing bitmap in the equivalence set, the routine branches to step 1028A, which ascertains whether the table has room for an additional equivalence set index. If it does, the routine proceeds to step 1035A, where a new equivalence set index is assigned. If it does not, the routine proceeds to step 1027A, which assigns the index zero and passes the bitmap for bitmap computation at the next level.

Preferably, the classification process also involves aligning the ABV's with word boundaries in the on-board cache of the CPU chip, thereby minimizing the number of CPU operations required for the location of the set bits in the ABV's.

Figure 16:
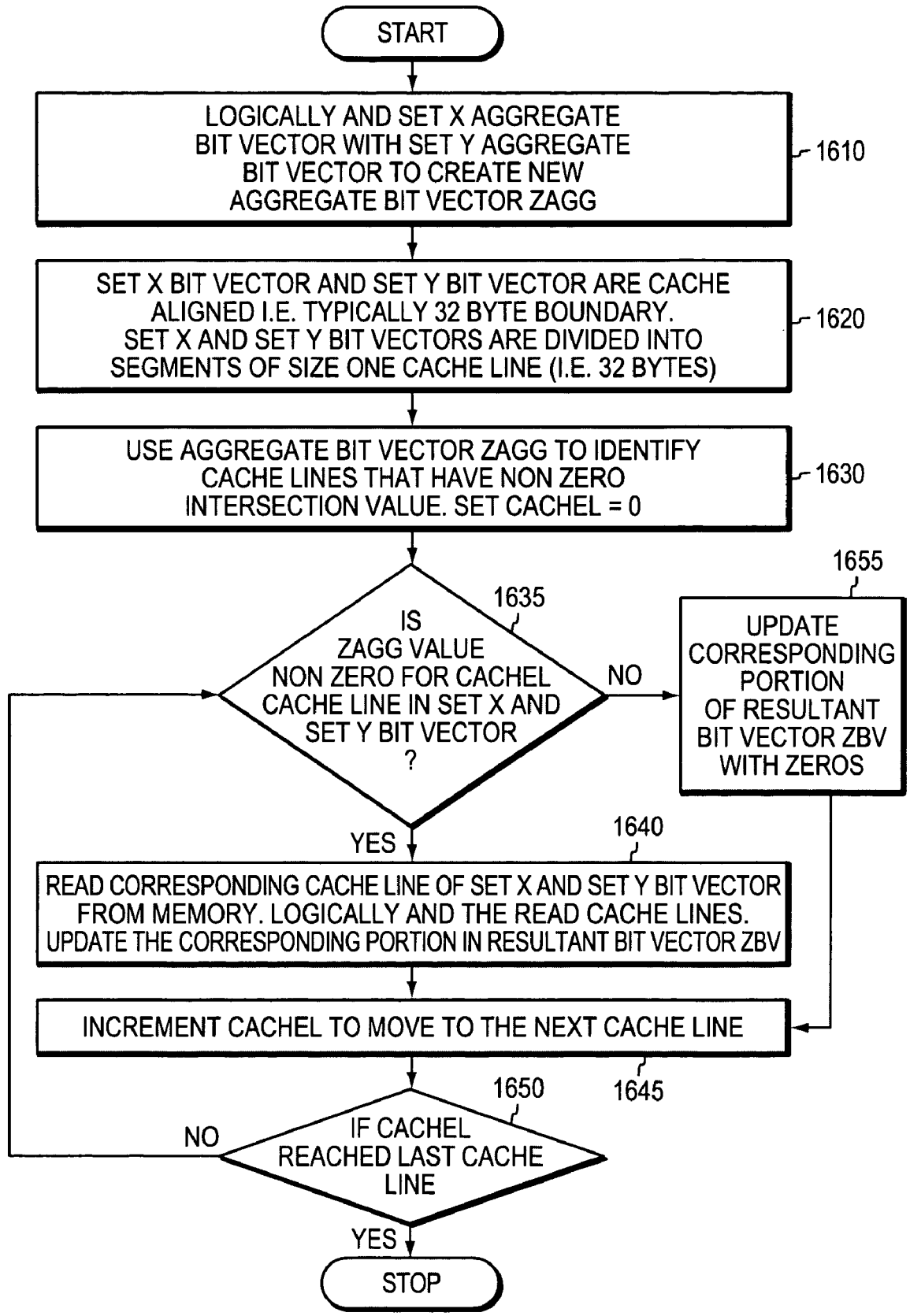
FIG. 16 is a flow chart illustrating the use of aggregate bit vectors.

This process is illustrated in FIG. 16. As shown therein, it begins in the classification routine when the aggregate bit vectors in equivalence sets X and Y are ANDed to create resultant aggregate bit vector Zagg (step 1610). Next, at step 1620, an X bit vector and a Y bit vector are cache aligned, typically at a 32 byte boundary. Thus these bit vectors are divided into segments of the size of a single cache line.

The routine proceeds to step 1630, where the aggregate bit vector Zagg identifies the cache lines that have non-zero intersections. Also, the cache line number (Cache L) is set to zero.

The routine then enters a loop, beginning at step 1635, which ascertains whether Zagg is non-zero for cache L. If it is, the procedure advances to step 1640 in the cache lines of the set X and set Y bit vectors are read from memory and logically ANDed and the corresponding portion of the resultant bit vector updated accordingly.

Next, at step 1645, cache L is incremented and, if the last cache line has not been reached (step 1650), the routine returns to step 1635. If at step 1635, the volume of Zagg is zero, the routine branches to step 1655, which updates the corresponding portion of resultant bit vector with zeros.

After step 1640 or step 1655, the procedure enters step 1650, where cache L is incremented and the algorithm loops back to step 1635. Also in step 1635, if the last cache line has been reached, the procedure ends.

Classification time is also reduced by organizing the classification rules such that multiple filters which match a packet are placed close to each other. The intent is that these multiple matching filters are part of the same aggregation group. The TurboACL algorithm gives us a list of all possible rules matching a packet. Arbitrary rearrangement of the ACL is allowed as long as we record the position of each ACE in the internal data structure and use it at TurboACL final table for classification of packet.

Those that are most likely used are positioned near the beginnings of the bit vectors, inasmuch as this again minimizes the number of computer operations required to find the best matching rule for a packet being classified. Specifically, the router can keep track of which classification rules are most often applied to packets that are classified. The bit vector bits that correspond to these rules are placed at or near the beginnings of the bit vectors.

What is claimed is:

1. A method of organizing classification tables for use in a packet classification algorithm in which incoming packets are matched with rules contained in access control data base, said method comprising the steps of:
   (A) constructing, by one or more processors of a network device, a set of top-level equivalence tables, each of which contains bit vectors identifying the rules specifying a value or values in a field in the packet headers, each table entry containing a unique bit vector and a equivalence ID specifying the bit vector;
   (B) constructing, by the one or more processors, a set of second-level of equivalence tables whose entries are indexed by a pair of equivalence ID's in a pair of top-leveled tables, each entry in the second level containing
      (1) a bit vector resulting from the intersection of the bit vectors in the corresponding top-level equivalence ID's, and
      (2) an equivalence ID specifying the bit vector;
   (C) constructing, by the one or more processors, a third-level set of equivalence tables whose entries are indexed by pairs of equivalence ID's in pairs of second-level tables, each entry in a third-level table containing
      (1) a bit vector resulting from the intersection of the bit vectors corresponding to the second-level equivalence ID's, and
      (2) an equivalence ID specifying the bit vector;
   (D) constructing, by the one or more processors, each of said third-level tables as a set of fragments, constructing a pointer array derived from the equivalence ID's in a second-level table, the contents of the pointer array pointing to the respective third-level table fragments, and the equivalence ID's of another of the second-level tables indicating depths of the entries in the table fragments;
   (E) recording a time when at least some tables of the set of top-level equivalence tables, second-level of equivalence tables or third-level equivalence tables were last rebuilt in order to classify a new type of packet;
   (F) accessing a minimum rebuild interval; and
   (C) timing a new rebuilding of the at least some tables to occur only after the minimum rebuild interval has elapsed since the last rebuild.

2. The method of claim 1 to further construct four levels of classification table levels, the fourth level consisting of a single table, the method including the steps of:
   (A) constructing the fourth level table with entries indexed by pairs of equivalence ID's in the third level tables, each entry in a fourth level table containing a bit vector resulting from the intersection of the bit vectors corresponding to the third level equivalence ID's;
   (B) constructing each of said fourth-level tables as a set of fragments, constructing a pointer array derived from the equivalence ID's in a third-level table, the contents of the pointer array pointing to the respective fourth-level table fragments, and the equivalence ID's of another of the third-level tables indicating depths of the entries in the table fragments.

3. The method of claim 1 in which, if the minimum rebuild interval has not expired, packet values are passed to a next lower level.

4. The method of claim 1, including the steps of:
   (A) generating aggregate bit vectors, wherein each bit in an aggregate bit vector corresponds with a section in a bit vector and is a ONE if, and only if, the corresponding section contains a ONE;
   (B) performing ANDing of aggregate bit vectors to provide aggregate bit vector intersections;
   (C) identifying bit vector sections corresponding to ONEs in the aggregate bit vectors; and
   (D) forming intersections of the bit vector sections containing the ONEs.

5. The method of claim 4 in which the length of each bit vector section equals the length of a cache line in a processor of the one or more processors performing steps in the method of claim 4.

6. An apparatus for organizing classification tables for use in a packet classification algorithm in which incoming packets are matched with rules contained in an access control database, said apparatus comprising:
   (A) means for constructing a set of top level equivalence tables, each of which contains bit vectors identifying the rules specifying a value or values in a field in the packet headers, each table entry containing a unique bit vector and an equivalence ID specifying the bit vector;
   (B) means for constructing a set of second-level of equivalence tables whose entries are indexed by a pair of equivalence ID's in a pair of top-leveled tables, each entry in the second level containing
      (1) a resultant bit vector resulting from the intersection of the bit vectors in the corresponding top-level equivalence ID's, and
      (2) an equivalence ID specifying the resultant bit vector;

(C) means for constructing a third-level set of equivalence tables whose entries are indexed by pairs of equivalence ID's in pairs of second-level tables, each entry in a third-level table containing
  (1) a next resultant bit vector resulting in from the intersection of the bit vectors corresponding to the second-level equivalence ID's, and
  (2) an equivalence ID specifying the next resultant bit vector; and
(D) means for:
  (1) constructing each of said third-level tables as a set of fragments,
  (2) constructing a pointer array derived from the equivalence ID's in a second-level table, the contents of the pointer array pointing to the respective third-level table fragments, and the equivalence ID's of another of the second-level tables indicating depths of the entries in the table fragments.

7. The apparatus of claim 6, including means for:
(A) recording the time when equivalence tables were last rebuilt;
(B) recording a minimum rebuild interval; and
(C) rebuilding tables to the extent necessary to classify packets when no previously classified packets have the same classifications if, and only if, the minimum rebuild interval has elapsed since the last rebuild.

8. The apparatus of claim 6 including means for constructing four equivalence table levels, the fourth level consisting of a single table, said apparatus including:
(A) means for constructing the fourth level tables with entries indexed by pairs of equivalence ID's in the third level tables, each entry in a fourth level table containing:
  (1) a bit vector resulting from the intersection of the bit vectors corresponding to the third level equivalence IDs; and
(B) means for:
  (1) constructing each of said of fourth-level tables as a set of fragments, and
  (2) constructing a pointer array derived from the equivalence ID's in a third-level table, the contents of the pointer array pointing to the respective fourth-level table fragments and the equivalence ID's of another of the third-level tables indicating depths of the entries in the table fragments.

9. A method comprising:
constructing, by one or more processors of a network device, a set of top-level tables associated with a top-level in a hierarchy of tables for use in a packet classification of incoming packets, each top-level table containing one or more top-level table entries, each top-level table entry associating a value, or values, of a section of a packet header with an equivalence-set index and a bit vector indicating one or more rules for classifying the incoming packets;
constructing, by the one or more processors, one or more successive-level tables associated with a successive-level in the hierarchy of tables, at least some of the one or more successive-level tables arranged as a set of table fragments;
recording a time at least some the tables in the hierarchy of tables were last rebuilt;
accessing a minimum rebuild interval; and
rebuilding, by the one or more processors, the at least some the tables in the hierarchy of tables only after the minimum rebuild interval has elapsed after the time the at least some of the tables in the hierarchy of tables were last rebuilt.

10. The method of claim 9 further comprising:
for each successive-level table arranged as an set of table fragments,
(i) allocating a data structure storing a plurality of pointers, the data structure providing a pointer to a particular table fragment in response to a first equivalence-set index from a higher-level table in the hierarchy of tables, and
(ii) indexing a depth into the particular table fragment in response to a second equivalence-set index from another higher-level table.

11. The method of claim 9 further comprising:
generating an aggregate bit vector from the bit vector of at least some table entries.

12. The method of claim 11 wherein each bit of an aggregate bit vector corresponds to a section in a corresponding bit vector, and is set if the section contains at least one bit that is set.

13. The method of claim 12 further comprising:
forming intersections of two or more aggregate bit vectors.

14. The method of claim 12 further comprising:
examining a section of a bit vector corresponding to a set bit in an aggregate bit vector, to ascertain a particular rule involved in a packet classification.

15. The method of claim 9 further comprising:
aligning the bit vectors with boundaries of cache lines.

16. The method of claim 9 wherein the step of constructing one or more successive-level tables comprises:
arranging the table fragments of the set of table fragments in substantially non-contiguous blocks of memory.

17. The method of claim 9 wherein each section is a same length.

18. An apparatus comprising:
a processor to construct a set of top-level tables associated with a top-level in a hierarchy of tables for use in a packet classification of incoming packets, each top-level table containing one or more top-level table entries, each top-level table entry arranged to associate a value, or values, of a section of a packet header with an equivalence-set index and a bit vector that indicates one or more rules for classifying the incoming packets, the processor further to construct one or more successive-level tables associated with a successive-level in the hierarchy of tables, at least some of the one or more successive-level tables arranged as a set of table fragments; and
a memory to hold the hierarchy of tables,
wherein the processor is further to record a time at least some the tables in the hierarchy of tables were last rebuilt, access a minimum rebuild interval, and rebuild the at least some the tables in the hierarchy of tables only after the minimum rebuild interval has elapsed after the time the at least some of the tables in the hierarchy of tables were last rebuilt.

19. The apparatus of claim 18 wherein the processor is further to, for each successive-level table arranged as an set of table fragments, allocate a data structure to store a plurality of pointers, the data structure providing a pointer to a particular table fragment in response to a first equivalence-set index from a higher-level table in the hierarchy of tables, and to index a depth into the particular table fragment in response to a second equivalence-set index from another higher-level table.

20. The apparatus of claim 18 wherein the processor is further to generate an aggregate bit vector from the bit vector of at least some table entries.

21. The apparatus of claim 20 wherein each bit of an aggregate bit vector corresponds to a section in a corresponding bit vector, and is set if the section contains at least one bit that is set.

22. The apparatus of claim 21 wherein the processor is further to form intersections of two or more aggregate bit vectors.

23. The apparatus of claim 21 wherein the processor is further to examine a section of a bit vector corresponding to a set bit in an aggregate bit vector, to ascertain a particular rule involved in a packet classification.

24. The apparatus of claim 18 wherein the memory is a cache, and the bit vectors are aligned with boundaries of cache lines.

25. The apparatus of claim 18 wherein the memory is further to store the table fragments of the set of table fragments in substantially non-contiguous blocks.

26. The apparatus of claim 18 wherein each section is a same length.

* * * * *

UNITED STATES PATENT AND TRADEMARK OFFICE
CERTIFICATE OF CORRECTION

PATENT NO. : 7,646,771 B2 Page 1 of 1
APPLICATION NO. : 11/236890
DATED : January 12, 2010
INVENTOR(S) : Parthibhan Parama Guru It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Col. 4, Line 43, please amend as shown:

backplane[[ 200]] 220 to the network.

Col. 7, Line 17, please amend as shown:

used to build[[ is]] the first-level lookup tables that map each

Signed and Sealed this

Thirtieth Day of November, 2010

David J. Kappos
*Director of the United States Patent and Trademark Office*